US009524539B2

United States Patent
Sun et al.

(10) Patent No.: US 9,524,539 B2
(45) Date of Patent: Dec. 20, 2016

(54) METHOD FOR EDGE-DIRECTED ADAPTIVE IMAGE INTERPOLATION AND VLSI IMPLEMENTATION DEVICE FOR THE SAME

(71) Applicant: XI'AN JIAOTONG UNIVERSITY, Xi'an (CN)

(72) Inventors: Hongbin Sun, Xi'an (CN); Qiubo Chen, Xi'an (CN); Xuchong Zhang, Xi'an (CN); Jie Yang, Xi'an (CN); Jizhong Zhao, Xi'an (CN); Nanning Zheng, Xi'an (CN)

(73) Assignee: XI'AN JIAOTONG UNIVERSITY, Shaanxi (CN)

( * ) Notice: Subject to any disclaimer, the term of this patent is extended or adjusted under 35 U.S.C. 154(b) by 5 days.

(21) Appl. No.: 14/831,795

(22) Filed: Aug. 20, 2015

(65) Prior Publication Data
US 2015/0363910 A1 Dec. 17, 2015

Related U.S. Application Data

(63) Continuation of application No. PCT/CN2014/076077, filed on Apr. 24, 2014.

(30) Foreign Application Priority Data

Sep. 11, 2013 (CN) .......................... 2013 1 0412603

(51) Int. Cl.
*G06K 9/32* (2006.01)
*G06T 3/40* (2006.01)
(Continued)

(52) U.S. Cl.
CPC ............. *G06T 3/403* (2013.01); *G06T 3/4007* (2013.01); *G06T 7/0085* (2013.01);
(Continued)

(58) Field of Classification Search
CPC ................ G06K 9/00; G06T 3/00; G06T 7/00
(Continued)

(56) References Cited

U.S. PATENT DOCUMENTS 4,910,786 A * 3/1990 Eichel .................. G06T 7/0083
382/199
2003/0206667 A1 11/2003 Wang et al. .................. 382/300
(Continued)

FOREIGN PATENT DOCUMENTS

CN         1761312 A      4/2006
CN      101790069 A      7/2010
(Continued)

OTHER PUBLICATIONS

Liu, Dongli, "Edge Detection and Its Application to Image Scaling" Thesis paper of Hefei University of Technology, No. 230001, Apr. 2009, pp. 1-56.
(Continued)

*Primary Examiner* — Abolfazl Tabatabai
(74) *Attorney, Agent, or Firm* — J.C. Patents

(57) ABSTRACT

Disclosed is a method for edge-directed adaptive image interpolation and a VLSI implementation device thereof. The method comprises: computing gradient magnitude and gradient direction of source image, obtaining edge information by comparing gradient magnitude and local adaptive threshold value, edge direction is vertical direction of the gradient direction; classifying edge direction, and filtering using edge information, so that an image is divided into regular edge region and non-edge region. Regular edge region interpolation is conducted along edge direction, methods of improved bicubic interpolation, parallelogram bicubic interpolation and parallelogram bilinear interpolation based on local gradient information are adopted according to classification of edge information; non-edge region
(Continued)

image interpolation is conducted by adopting improved bicubic interpolation method based on local gradient information. The device of the present invention comprises edge information extracting module, adaptive interpolation module, input line field synchronous control module and scaling line field synchronous control module.

10 Claims, 7 Drawing Sheets

(51) Int. Cl.
 *G06T 7/00* (2006.01)
 *H04N 5/14* (2006.01)
(52) U.S. Cl.
 CPC ........... *G06T 2207/20008* (2013.01); *G06T 2207/20024* (2013.01); *G06T 2207/20148* (2013.01); *G06T 2207/20192* (2013.01)
(58) Field of Classification Search
 USPC .............. 382/199, 256, 266, 268, 269, 300; 348/26, 252
 See application file for complete search history.

(56) References Cited

U.S. PATENT DOCUMENTS

2004/0114833 A1* 6/2004 Jiang ................. G06T 3/4007
 382/300
2006/0039590 A1* 2/2006 Lachine ............... G06T 3/403
 382/128

FOREIGN PATENT DOCUMENTS

| | | |
|---|---|---|
| CN | 101866479 A | 10/2010 |
| CN | 102170572 A | 8/2011 |
| CN | 102186044 A | 9/2011 |
| CN | 103500435 A | 1/2014 |

OTHER PUBLICATIONS

Zhao, Lihua "Edge-based Image Inerpolation Algorithm" Thesis paper of Kunming University of Science and Technology, Sep. 2009-Oct. 2011, pp. 1-69.
Gong Yi Gang et al., "An Adaptive Image Interpolation Algorithm Based on Edge Information" Computer Applications and Software, vol. 26, No. 4, Apr. 2009, pp. 421-424.
International Search Report of corresponding International PCT Application No. PCT/CN2014/076077, dated Apr. 4, 2013.

* cited by examiner

METHOD FOR EDGE-DIRECTED ADAPTIVE IMAGE INTERPOLATION AND VLSI IMPLEMENTATION DEVICE FOR THE SAME

CROSS-REFERENCE TO RELATED APPLICATIONS

This application is a continuation of International application No. PCT/CN2014/076077, filed on Apr. 24, 2014, which claims priority to Chinese application No. 201310412603.8, filed on Sep. 11, 2013, both of which are incorporated herein by reference in their entireties.

TECHNICAL FIELD

The present invention relates to the technical field of digital video image processing and display, and more particularly, to a method and a VLSI implementation device for edge-directed adaptive image interpolation.

BACKGROUND

With a diverse range of video source resolution in video display system, a scaling process for image interpolation is required before a video input signal is transferred into a flat-panel display device to display. A scaling unit for image interpolation upscaling or downscaling images of different formats and resolutions, so that the images can be supported by a display screen. As the size and resolution of the display panel increasing, image interpolation scaling technology plays a more important role in video processing system. Since the performance of image interpolation scaling technology directly affects the quality of displayed video, there is an urgent need to apply a high-quality image interpolation scaling technique in video display system, in order to improve visual experience of the user.

Nowadays, high definition (High Definition, HD) resolutions have been widely adopted in flat-panel display devices. Ultra-HD resolution 4K (3840*2160) has grown rapidly in this field. However, most video sources are still in a level of standard definition resolution due to limiting factors like filming, editing and processing devices. For example, when a video source with resolution of 480 P (720*480) is displayed on a 4K resolution display panel, the upscaling factor may reach 25, such a high magnification scaling results in that conventional image scaling technique based on bilinear and bicubic generates noticeable zigzag or distortion at edge regions of the image, and thereby cannot meet the actual demand of users.

Edge-directed adaptive image interpolation technique takes the difference among image content information into consideration, adaptively selects appropriate method to solve the distortion problem occurred in edges and particulars of the image. However, edge interpolation computation generally requires complicated algorithm computation and excessive computing resources, which is hard to be realized by using an integrated circuit design, and thus, it is difficult to meet the requirement of a video display system for real-time processing.

SUMMARY

The object of the present invention is to provide a method of edge-directed adaptive image interpolation with low-cost of hardware resources and a VLSI implementation device thereof. The method ensures that the image edges and image details are displayed clearly without distortion under high-magnification scaling condition; meanwhile, the method can also conduct a real-time processing for video images using limited computing resources, which facilitates implementation of an integrated module architecture.

In order to accomplish the goals as mentioned above, the method of edge-directed adaptive image interpolation according to the present invention, including the steps of:

1) computing a gradient magnitude and a gradient direction of a source image pixel, and obtaining edge information by comparing the gradient magnitude with a local adaptive threshold value, an edge direction is a vertical direction of the gradient direction;

2) dividing the edge direction into eight angle domains, and filtering edge information by an edge information filtering method, so that the source image is divided into a regular edge region and a non-edge region; wherein the filtering method includes the steps of:

2.1) selecting 16 pixels in a 4*4 array around a pixel pi to be interpolated as reference pixels for filtering edge information, the 4*4 array being regarded as a reference array, counting the pixels in the 4*4 array, denoted as counter; counting, among the number of edge pixels in the 4*4 array, the number of the edge pixels in the eight angle domains classified according to edge direction, respectively, denoted as edge_ counter (m), m=0, 1, . . . 7; finding out the angle domain with the maximum number of the edge pixels from the eight angle domains, denoted as $m_m$, the number of edge pixels thereof being denoted as max_edge_counter, and direction of the edge pixels of $m_{max}$ being denoted as max_edge_region;

2.2) if counter ≥4 and max_edge_counter/counter>th, then pi is located at the regular edge region; the edge direction of pi is denoted as max_edge_region, conducting interpolation along the edge direction of pi; otherwise, pi is located at the non-edge region; wherein, th represents a judging threshold value;

3) dividing the eight angle domains obtained through edge direction classification into angle class I, angle class II and angle class III; when the pixel to be interpolated pi is located at the regular edge region, and if pi is in the angle class I, interpolating the image using an improved bicubic interpolation method based on local gradient information; if pi is in the angle class II, interpolating the image using a parallelogram bicubic interpolation method; if pi is in the angle class III, interpolating the image using a parallelogram bilinear interpolation method;

When pi is located at the non-edge region, interpolating the image using the improved bicubic interpolation method based on local gradient information.

The local adaptive threshold value is computed as:

For each pixel of the source image, calculating an average value average_th of the gradient magnitude within a 3*3 window, which takes the pixel as the center, a local adaptive threshold value local_ th is obtained through the following equation:

$$local\_th = max(average\_th, min\_th)$$

wherein min_th is a determined lower limit of the local adaptive threshold value.

Referring to step 2), the method of dividing the edge direction into eight angle domains is:

dividing the edge direction into eight angle domains, denoted as angle domains 0-7, by taking a ray line, respectively, in the direction of 0, 22.5, 45, 67.5, 90, 112.5, 135 and 157.5 degrees which passes a zero crossing point and its respective oppositely extension line as a central dividing line, and then rotating the central dividing line clockwise and counterclockwise 11.25 degrees respectively.

Referring to step 3), the angle Class I includes angle domain 0 and angle domain 4, the angle domain 0 is in the horizontal edge direction, and the angle domain 4 is in the vertical edge direction; the angle Class II includes angle domain 2 and angle domain 6, the angle domain 2 is in the edge direction of 45 degrees, and the edge domain 6 is in the edge direction of 135 degrees; the angle class III includes angle domain 1, angle domain 3, angle domain 5 and angle domain 7, the angle domain 1 is in the edge direction of 22.5 degrees, the angle domain 3 is in the direction of 67.5 degrees, the edge domain 5 is in the edge direction of 112.5 degrees and the angle domain 7 is in the edge direction of 157.5 degrees.

The improved bicubic interpolation method based on local gradient information is:

pi is defined as the pixel to be interpolated, P(i−1, j−1)~P(i+2, j+2) represents 16 pixels of source image in the domain adjacent to pi, an adjusted template of interpolating coefficient weight is as follows:

$$\begin{cases} H_l = 1 \Big/ \sqrt{\dfrac{1 + \alpha(\text{abs}(P(i, j) - P(i, j-1))) +}{\alpha(\text{abs}(P(i+1, j) - P(i+1, j-1)))}} \\ H_r = 1 \Big/ \sqrt{\dfrac{1 + \alpha(\text{abs}(P(i, j+1) - P(i, j+2))) +}{\alpha(\text{abs}(P(i+1, j+1) - P(i+1, j+2)))}} \\ V_u = 1 \Big/ \sqrt{\dfrac{1 + \alpha(\text{abs}(P(i, j) - P(i-1, j))) +}{\alpha(\text{abs}(P(i, j+1) - P(i-1, j+1)))}} \\ V_l = 1 \Big/ \sqrt{\dfrac{1 + \alpha(\text{abs}(P(i+1, j) - P(i+2, j))) +}{\alpha(\text{abs}(P(i+1, j+1) - P(i+2, j+2)))}} \end{cases}$$

In the equations: $H_l$ is an adjusted template of weight at the left of the horizontal direction; $H_r$ is an adjusted template of weight at the right of the horizontal direction; $V_u$ is an adjusted template of weight at upper side of the vertical direction; $V_l$ is an adjusted template of weight at lower side of the vertical direction; a is an adjustable parameter;

After computing the templates of $H_l$, $\text{li}_r$, $V_u$ and $V_l$, conducting a process of normalization to interpolating coefficients, thereby to obtain an improved bicubic interpolation equation based on local gradient information, followed by interpolating the pixel to be interpolated using the improved bicubic interpolation equation based on local gradient information.

Referring to step 3), the parallelogram bicubic interpolation method differs from the bicubic interpolation method in that: when selecting an array for the pixel to be interpolated, directionally offsetting the reference array based on corresponding angle of angle domain where the pixel to be interpolated is located and the location of the pixel to be interpolated.

Referring to step 3), the parallelogram bilinear interpolation method differs from bilinear interpolation method in that: when selecting an array for the pixel to be interpolated, directionally offsetting the reference array based on corresponding angle of angle domain where the pixel to be interpolated is located and the location of the pixel to be interpolated.

A VLSI implementation device for implementing the method of edge-directed adaptive image interpolation, the device includes an edge information extracting module, an adaptive interpolating module, an input field synchronous control module and a scaling field synchronous control module.

The input field synchronous control module is configured to provide a synchronized field signal H/V to the edge information extracting module, the adaptive interpolation module and the scaling field synchronous control module.

The edge information extracting module is configured to extract edge information from input video image.

The scaling field synchronous control module is configured to generate scaling video H/V synchronous information, output the scaling field synchronous signal H/V to the adaptive interpolating module.

The adaptive interpolating module is configured to adaptively interpolate an input video, and then output a scaling video signal which matches the resolution of display.

The VLSI implementation device for implementing the method of edge-directed adaptive image interpolation, wherein the edge information extracting module includes a first line memory array module, a gradient magnitude computation module, a gradient direction computation and classification module, a local adaptive threshold value computation module, an image binarization module and an edge information filtering module.

The hardware implementation manner of the first line memory array module, is dual-port SRAM, configured to buffer video data in adjacent lines.

The gradient magnitude computation module is configured to compute the gradient magnitude of a source image.

The local adaptive threshold value computation module is configured to obtain the local adaptive threshold value which corresponds to each pixel of the source image, after passing a 3*3 average filter, on the basis of gradient magnitude computation;

The image binarization module is configured to input the gradient magnitude and the local adaptive threshold value of the source image, and extract edge information of the source image by comparing the gradient magnitude and corresponding local adaptive threshold value of the source image;

the gradient direction computation and classification module is configured to divide the edge direction into eight angle domains according to the edge direction.

The edge information filtering module is configured to determine whether the pixel to be interpolated is located at the regular edge region and adjust the edge direction of the pixel to be interpolated.

The adaptive interpolating module includes a second line memory array module, an pixel to be interpolated offset generation and reference pixel selection module, an interpolation coefficient look-up table memory module, three-patterns interpolating modules and an output selection module.

The pixel to be interpolated offset generation and reference pixel selection module is configured to compute offset between the pixel to be interpolated and the reference pixel, and compute the reference pixels array required for the present interpolation, then send the computed offset signal to the interpolation coefficient look-up table memory module.

A hardware implementation manner of the interpolating coefficient look-up table memory module is ROM or SRAM, configured to obtain the interpolating coefficients required for the present pixel to be interpolated based on the offset.

A hardware implementation manner of the second line memory array module is dual-port SRAM, configured to buffer video data in adjacent lines, and select corresponding reference pixels array based on the present pixel to be interpolated.

The three-patterns interpolating modules includes an improved bicubic interpolating module based on gradient information, a parallelogram bilinear interpolation module and a parallelogram bicubic interpolation module; the input signals of the three-patterns interpolation modules are interpolating coefficients obtained from the output of the interpolating coefficient look-up table memory module and interpolating reference pixel array obtained from the output of the second line memory array module.

The output selection module is configured to select an interpolating method that interpolates the present pixel to be interpolated from the three-patterns interpolating modules; the selection of interpolating method is decided by adopting the output of using the edge information outputted by the edge information extracting module as a control signal.

Compared with prior art, the beneficial effects of the present invention lie in:

The method of adaptive image interpolation according to the present invention, firstly, extracting edge information of a source image through a simple gradient magnitude and gradient direction computation, and dividing the edge direction into eight angle domains, followed by filtering edge noise by an edge information filter, ensuring the precision of the edge information and direction information of the pixel to be interpolated; finally, adopting an adaptive interpolating method according to different directions, thus resolving the problems like blur or zigzag edges occurred in the source image under a high-magnification scaling condition. The method is widely adapted to all kinds of image contents. In the present invention, the computation for each module is relatively simple, and the essential aspects of edge-directed adaptive interpolating technique is using appropriate computing resource and optimal processing speed to achieve an excellent protection for image edges and details during the scaling process, which facilitates an integrated module architecture. Therefore, the present invention has advantages of convenient VLSI hardware implementation, using reduced consumption of resources and meeting a real-time process requirement.

DESCRIPTION OF EMBODIMENTS

The present invention will be described in detail with reference to the drawings and embodiments.

Referring to FIGS. 1-8, the method for edge-directed adaptive image interpolation provided by the present invention includes two sections: edge information extraction and adaptive interpolation.

Figure 1:
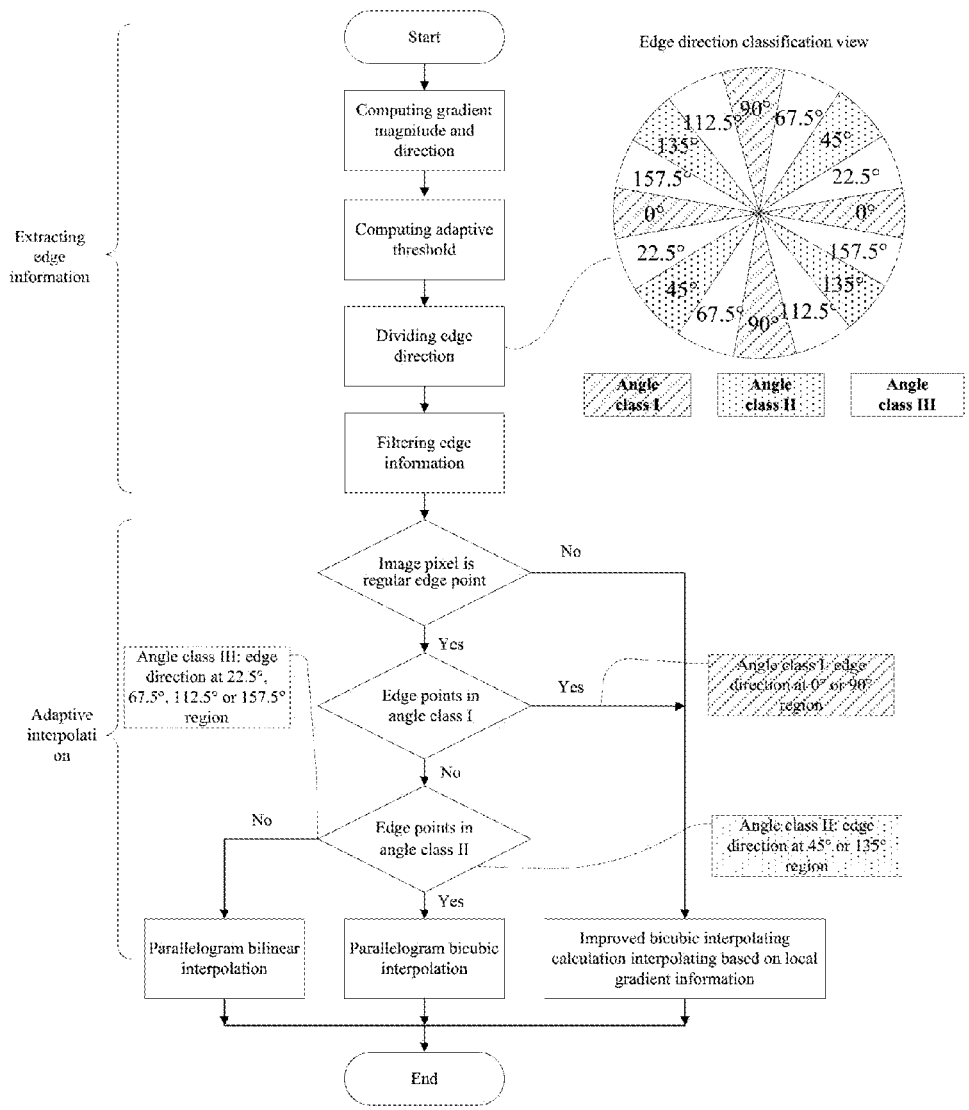
FIG. 1 is a flowchart of a method for adaptive edge-directed image interpolation according to the present invention.
Figure 2:
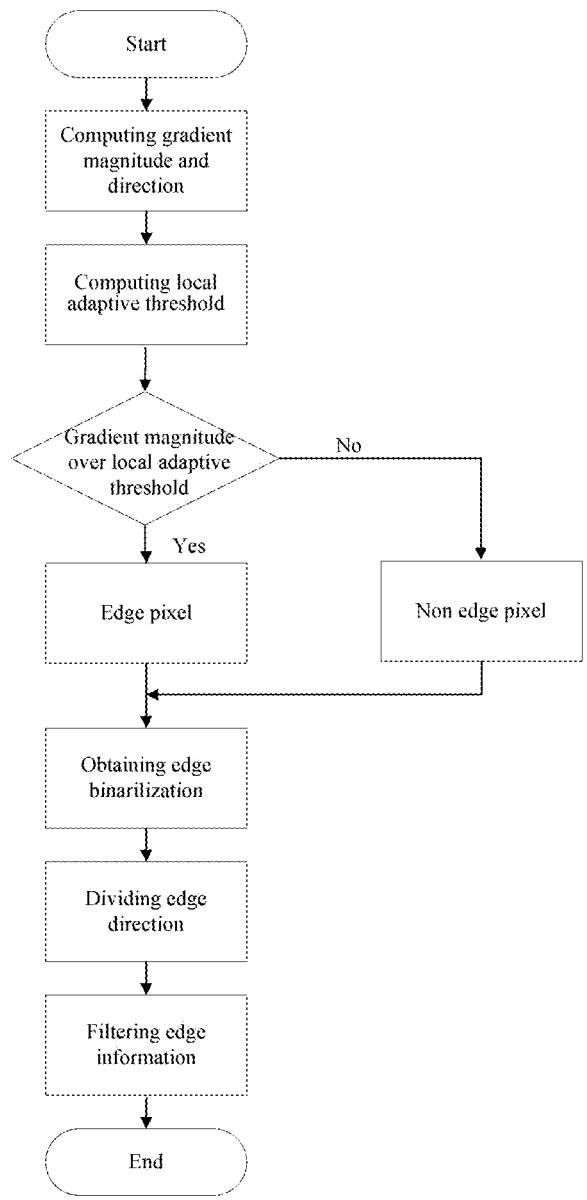
FIG. 2 is a flowchart of edge information extraction according to the present invention.

1) FIG. 2 is a flow chart of edge information extraction. Computing gradient magnitude and gradient direction of source image pixels, obtaining edge information by comparing the gradient magnitude and local adaptive threshold value; if the gradient magnitude of a certain pixel is greater than the local adaptive threshold value, then the pixel is determined as an edge pixel, otherwise as a non-edge pixel; obtaining an edge binary image according to the comparison result of the gradient magnitude and the local adaptive threshold value; the method for computing the local adaptive threshold value includes: for each pixel in the source image, calculating an average value average_th of the gradient magnitude within a 3*3 window, which takes the pixel as the center, then a local adaptive threshold value local_ th is obtained through the following equation:

local_th=max(average_th,min_th)

in the equation, min_th is a determined lower limit of the local adaptive threshold value, min_th is an integer which ranges from 10 to 30.

Edge direction information is a vertical direction of the gradient direction.

Figure 3:
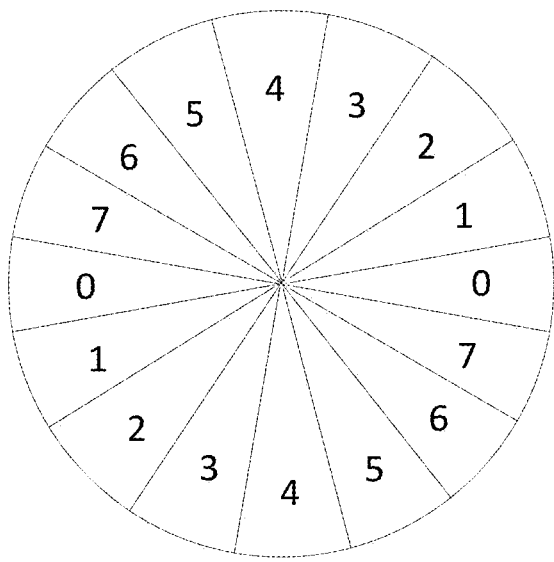
FIG. 3 is a schematic diagram of edge direction classification according to the present invention.

2) FIG. 3 is a schematic view of edge direction classification. In order to improve the precision of the direction interpolation, the edge direction needs to be classified. The edge direction is classified into eight angle domains according to the present application. The specific classification method includes: dividing the edge direction into eight angle domains, denoted as angle domains 0-7, taking a ray line, respectively, in the direction of 0, 22.5, 45, 67.5, 90, 112.5, 135 and 157.5 degrees which passes the zero crossing point and its respective oppositely extension line as the central dividing line, and then rotating the central dividing line clockwise and counterclockwise 11.25 degrees respectively.

Figure 4:
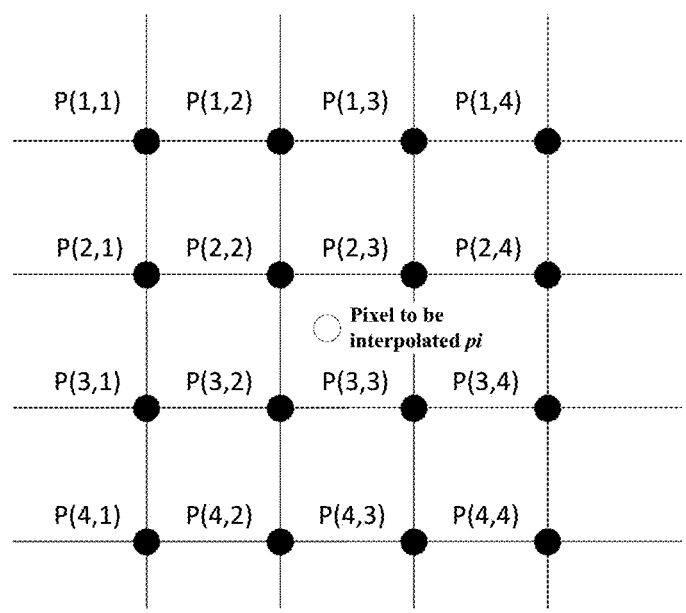
FIG. 4 is a schematic diagram of an edge information filtering method for selecting pixels array according to the present invention.
Figure 5:
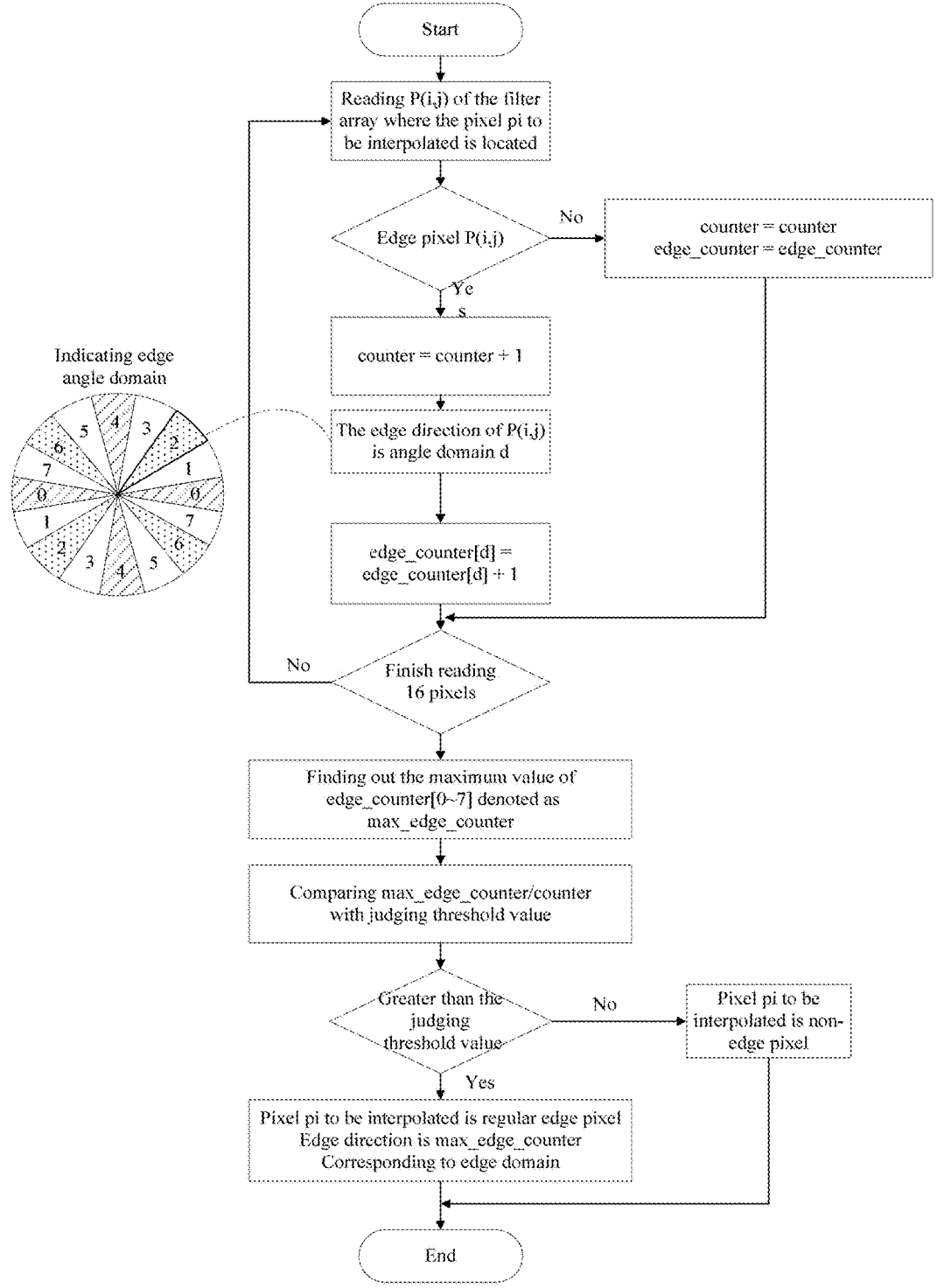
FIG. 5 is a flowchart of an edge information filtering method according to the present invention.

After the edge direction is classified completely, filtering the edge information by an edge information filtering method so as to divide the content of the source image into a regular edge region and a non-edge region; the regular edge region refers to a region having a greater luminance gradient value at local region and showing consistent characteristics at edge direction, the rest all belongs to non-edge region; then defining an interpolation direction according to the range of region where the edge direction is located; the filtering method is shown in FIGS. 4-5, which includes the following steps:

2.1) counting edge information in the selected pixel array shown in FIG. 4, the specific steps are shown in FIG. 5:

Selecting 16 pixels of P(1,1)~P(4,4) in a 4*4 array around a pixel pi to be interpolated as reference pixels for filtering edge information, the 4*4 array is regarded as a reference array, counting the number of edge pixels in the 4*4 array, denoted as counter; counting, among the number of edge pixels in the 4*4 array, the number of edge pixels in the eight angle domains classified according to edge direction, respectively, denoted as edge_ counter (m), m=0, 1, . . . 7; finding out the angle domain with the maximum number of edge pixels from the eight angle domains, recorded as $m_{max}$ the number of edge pixels thereof is denoted as max_edge_counter, and direction of the edge pixels of $m_{max}$ is denoted as max_edge_region;

2.2) Start filtering after the counting of edge information is completed, the filtering principle is based on the fact that: noise pixels detected at the edge have poor continuity, the number of which in the field being determined as edge pixels is small; those noise pixels also have a poor directivity, so that the probability of falling into the same or adjacent edge region is much lower. For the regular edge, as concerned in the present invention, the filtering process is conducted as follows:

If counter ≥4 and max_edge_counter/counter>th, then pi is located at the regular edge region; the edge direction of pi is denoted as max_edge_region, interpolation is conducted along the edge direction of pi; otherwise, pi is located at the non-edge region, an improved bicubic interpolating method based on local gradient information is adopted (disclosed in "Hwang, Jung Woo, and Hwang Soo Lee, Adaptive image interpolation based on local gradient features. Signal Processing Letters, IEEE 11.3 (2004): 359-362); th represents judging threshold value which ranges from 0.5 to 0.8; the greater the value used, the less edge pixels obtained, however, the higher probability of obtaining the interpolated pixels as regular edge pixels, the lower noise.

3) When the pixel pi to be interpolated is located at the regular edge region, i.e., after edge filtering, pi is still determined as the pixel to be interpolated at the edge region, dividing the angle domain where the pixel to be interpolated is located into an angle class I, an angle class II and an angle class III. The angle Class I includes angle domain 0 and angle domain 4, the angle domain 0 is in the horizontal edge direction, and the angle domain 4 is in the vertical edge direction; the angle Class II includes angle domain 2 and angle domain 6, the angle domain 2 is in the edge direction of 45 degrees, and the edge domain 6 is in the edge direction of 135 degrees; the angle class III includes angle domain 1, angle domain 3, angle domain 5 and angle domain 7, the angle domain 1 is in the edge direction of 22.5 degrees, the angle domain 3 is in the direction of 67.5 degrees, the edge domain 5 is in the edge direction of 112.5 degrees and the angle domain 7 is in the edge direction of 157.5 degrees.

If the pixel pi to be interpolated is in the angle class I, the improved bicubic interpolation method based on local gradient information is adopted; if the pixel pi to be interpolated is in the angle class II, a parallelogram bicubic interpolation method is adopted; if the pixel pi to be interpolated is in the angle class III, a parallelogram bilinear interpolation method is adopted for image interpolation;

When the pixel pi to be interpolated is located at the non-edge region, the improved bicubic interpolation method based on local gradient information is adopted for image interpolation.

Figure 6:
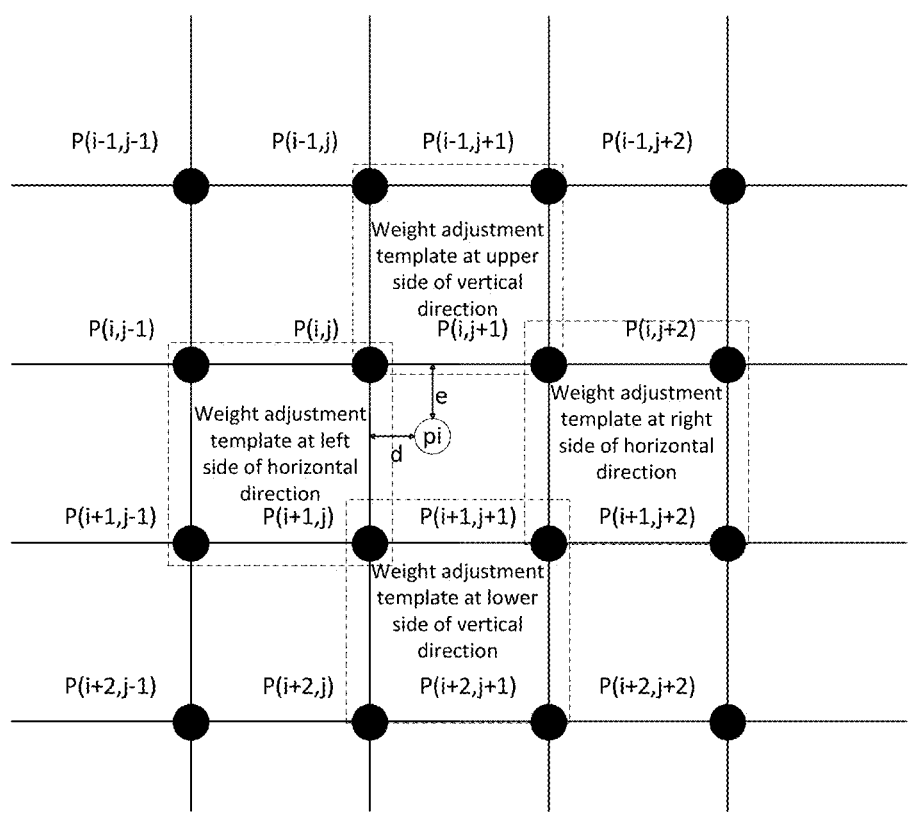
FIG. 6 is a schematic diagram of a template for an improved bicubic interpolation algorithm based on local gradient information according to the present invention.

FIG. 6 is a schematic view of a template for an improved bicubic interpolating method based on local gradient information. pi is defined as the pixel to be interpolated, P(i−1, j−1)~P(i+2, j+2) represents 16 pixels of the source image in the domain adjacent to pi, an adjusted template of interpolating coefficient weight is as follows:

$$\begin{cases} H_l = 1 \Big/ \sqrt{\begin{array}{l}1+\alpha(abs(P(i,j)-P(i,j-1)))+\\ \alpha(abs(P(i+1,j)-P(i+1,j-1)))\end{array}} \\ H_r = 1 \Big/ \sqrt{\begin{array}{l}1+\alpha(abs(P(i,j+1)-P(i,j+2)))+\\ \alpha(abs(P(i+1,j+1)-P(i+1,j+2)))\end{array}} \\ V_u = 1 \Big/ \sqrt{\begin{array}{l}1+\alpha(abs(P(i,j)-P(i-1,j)))+\\ \alpha(abs(P(i,j+1)-P(i-1,j+1)))\end{array}} \\ V_l = 1 \Big/ \sqrt{\begin{array}{l}1+\alpha(abs(P(i+1,j)-P(i+2,j)))+\\ \alpha(abs(P(i+1,j+1)-P(i+2,j+2)))\end{array}} \end{cases}$$

In the equations, $H_l$ is an adjusted template of weight at the left of the horizontal direction; $H_r$ is an adjusted template of weight at the right of the horizontal direction; $V_u$ is an adjusted template of weight at upper side of the vertical direction; $V_l$ is an adjusted template of weight at lower side of the vertical direction; α is an adjustable parameter; the greater the α, the more the interpolating coefficient weight is affected by gradient value, and vise versa, α is preferably 0.01.

The present invention adopts offline calculation for computing interpolating weight template, and employs a RAM look-up table instead of a square root computation. Taking the adjusted template $H_l$ of weight at the left of the horizontal direction as an example, $H_l=1/\sqrt{1+\alpha(abs(P(i,j)-P(i,j-1)))+\alpha(abs(P(i+1,j)-P(i+1,j-1)))}$ is deformed into:

$$H_l = 1/\sqrt{1+\alpha \times \Delta x}$$

in the equation

:$\Delta x = abs(P(i,j)-P(i,j-1))+abs(P(i+1,j)-P(i+1,j-1))$ for the defined value α, the value range of Δx can be 511 types (concerning 8 images), thus result in 511 corresponding values of $H_l$.

Likewise:

$$H_r = 1/\sqrt{1+\alpha(abs(P(i,j+1)-P(i,j+2)))+\alpha(abs(P(i+1,j+1)-P(i+1,j+2)))}$$

$$V_u = 1/\sqrt{1+\alpha(abs(P(i,j)-P(i-1,j)))+\alpha(abs(P(i,j+1)-P(i-1,j+1)))}$$

$$V_l = 1/\sqrt{1+\alpha(abs(P(i+1,j)-P(i+2,j)))+\alpha(abs(P(i+1,j+1)-P(i+2,j+2)))}$$

The equation can also be deformed according to the deformation manner of template $H_l=1/\sqrt{1+\alpha(abs(P(i,j)-P(i,j-1)))+\alpha(abs(P(i+1,j)-P(i+1,j+1)))}$.

According to the present invention, firstly all the weight adjustment template values ($H_l$, $H_r$, $V_u$ and $V_l$) are computed offline, and then using the RAM line memory of hardware design regards Δx as address and regards the corresponding weight adjustment template values as memory contents respectively, through the manner of reading the line memory look-up table of corresponding address to avoid the operation of extracting root. Using RAM has advantages that upon different α, different weight adjustment templates can be obtained, and based on different α, different weight adjustment templates are generated offline, which are written into RAM instead of the operation of extracting root.

After weight adjustment template values have been computed, a new bicubic interpolating equation can be obtained through normalization, the specific steps are as follows:

First, define $Sumh = h1+h2 \times H_l+h3 \times H_r+h4; Sumv = v1+v2 \times V_u+v3 \times V_l+v4$ In the equations, h1, h2, h3 and h4 are four interpolating coefficients of bicubic interpolation in the horizontal direction; v1, v2, v3, v4 are four interpolating coefficients of bicubic interpolation in the vertical direction; in FIG. 6, define deltah=d and deltav=e; deltah represents a relative distance in "horizontal direction", and deltav represents a relative distance in "vertical direction", thus the h1-h4 are expressed by the following equations:

$$\begin{cases} h1 = (-deltah^3 + 2 \times deltah^2 - deltah)/2 \\ h2 = (3 \times deltah^3 - 5 \times deltah^2 + 2)/2 \\ h3 = (-3 \times deltah^3 + 4 \times deltah^2 + deltah)/2 \\ h4 = (deltah^3 - deltah^2)/2 \end{cases}$$

Similarly, the v1~v4 are expressed as follows:

$$\begin{cases} v1 = (-deltav^3 + 2 \times deltav^2 - deltav)/2 \\ v2 = (3 \times deltav^3 - 5 \times deltav^2 + 2)/2 \\ v3 = (-3 \times deltav^3 + 4 \times deltav^2 + deltav)/2 \\ v4 = (deltav^3 - deltav^2)/2 \end{cases}$$

After sumn and sumv were obtained, a new interpolating coefficient can be obtained through normalization. The specific process of normalization is as follows.

$$\begin{cases} mh1 = h1/Sumh \\ mh2 = h2 \times H_l/Sumh \\ mh3 = h3 \times H_r/Sumh \\ mh4 = h4/Sumh \end{cases}$$

Similarly, the following equations can be obtained:

$$\begin{cases} mv1 = v1/Sumv \\ mv2 = v2 \times V_u/Sumh \\ mv3 = v3 \times V_l/Sumv \\ mv4 = v4/Sumv \end{cases}$$

Thus, the interpolation equations of an improved bicubic interpolating method based on local gradient information are given as below (take FIG. 6 as an example):

$$\begin{cases} ph1 = P(i-1, j-1) \times mh1 + P(i-1, j) \times mh2 + P(i-1, j+1) \times mh3 + P(i-1, j+2) \times mh4 \\ ph2 = P(i, j-1) \times mh1 + P(i, j) \times mh2 + P(i, j+1) \times mh3 + P(i, j+2) \times mh4 \\ ph3 = P(i+1, j-1) \times mh1 + P(i+1, j) \times mh2 + P(i+1, j+1) \times mh3 + P(i+1, j+2) \times mh4 \\ ph4 = P(i+2, j-1) \times mh1 + P(i+2, j) \times mh2 + P(i+2, j+1) \times mh3 + P(i+2, j+2) \times mh4 \end{cases}$$

In the equations, ph1-ph4 are interpolation pixels obtained through quartic interpolation in horizontal direction, and conducting another interpolation in vertical direction on the above obtained pixels, thereby the following equation is obtained:

$$pi = ph1 \times mv1 + ph2 \times mv2 + ph3 \times mv3 + ph4 \times mv4$$

According to the present invention, the parallelogram bicubic interpolation method differs from the bicubic interpolation method in that: when selecting an array of pixels to be interpolated, directionally offsetting the reference array based on the angles corresponding to the angle domain where the pixel to be interpolated is located and based on the location of the pixel to be interpolated. I.e., selection of the image pixels involved in interpolation depends on the selection of a pixel array for bicubic interpolation as a basic expansion, directionally offsetting the reference array based on the interpolating direction, and adjusting according to the position where the pixel to be interpolated is located.

Figure 7:
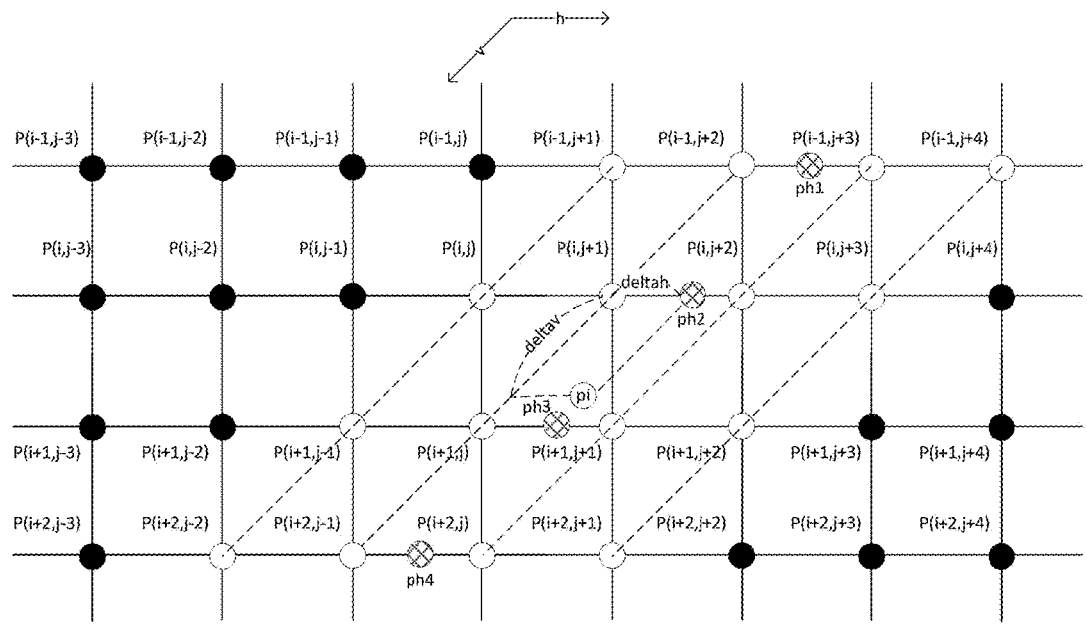
FIG. 7 is a schematic diagram illustrating a parallelogram bicubic interpolation is adopted at the angle domain of 45 degrees according to the present invention; wherein, h is the horizontal direction, v is the vertical direction.

FIG. 7 is schematic view illustrating a parallelogram bicubic interpolation is adopted at angle domain of 45 degrees. The pixel to be interpolated is denoted as pi. As can be seen from FIG. 6, designating a pixel, which is the most adjacent to pi and is located at the upper left thereof, as a reference pixel, the distance between pi and reference pixel is defined as (d, e), where d represents a horizontal distance and e represents a vertical distance, 0≤d, e≤1. In accordance with the relationship of relative position of the pixel to be interpolated and the source image, there are two interpolation situations. The relevant distances of "the horizontal direction" and "the vertical direction" are defined as deltah and deltav respectively, which are converted into expressions of parameters d, e based on an equal ratio characteristic of parallel lines in geometry of plane. To simplify the computation, the normalized deltah and deltav are denoted as Δh and Δv respectively.

Interpolation Example 1, as shown in FIG. 7, (1−d)/e≤1: Selecting the pixel to be interpolated (refer to p11~p44):

$$p_{11}=P(i-1,j+1), p_{12}=P(i-1,j+2), p_{13}=P(i-1,j+3), p_{14}=P(i-1,j+4)$$

$$p_{21}=P(i,j), p_{22}=P(i,j+1), p_{23}=P(i,j+2), p_{24}=P(i,j+3)$$

$$p_{31}=P(i+1,j-1), p_{32}=P(i+1,j), p_{33}=P(i+1,j+1), p_{34}=P(i+1,j+2)$$

$$p_{41}=P(i+2,j-2), p_{42}=P(i+2,j-1), p_{43}=P(i+2,j), p_{44}=P(i+2,j+1)$$

Interpolating Equations:

$$\Delta h = d+e-1, \Delta v = e$$

$$\text{coef}h1=(-\Delta h^3+2\times\Delta h^2-\Delta h)/2, \text{coef}h2=(3\times\Delta h^3-5\times\Delta h^2+2)/2$$

$$\text{coef}h3=(-3\times\Delta h^3+4\times\Delta h^2+\Delta h)/2, \text{coef}h4=(\Delta h^3-\Delta h^2)/2$$

$$\text{coef}v1=(-\Delta v^3+2\times\Delta v^2-\Delta v)/2, \text{coef}v2=(3\times\Delta v^3-5\times\Delta v^2+2)/2$$

$$\text{coef}v3=(-3\times\Delta v^3+4\times\Delta v^2+\Delta v)/2, \text{coef}v4=(\Delta v^3-\Delta v^2)/2$$

$$ph1=p_{11}\times\text{coef}h1+p_{12}\times\text{coef}h2+p_{13}\times\text{coef}h3+p_{14}\times\text{coef}h4$$

$$ph2=p_{21}\times\text{coef}h1+p_{22}\times\text{coef}h2+p_{23}\times\text{coef}h3+p_{24}\times\text{coef}h4$$

$$ph3=p_{31}\times\text{coef}h1+p_{32}\times\text{coef}h2+p_{33}\times\text{coef}h3+p_{34}\times\text{coef}h4$$

$$ph4 = p_{41} \times coefh1 + p_{42} \times coefh2 + p_{43} \times coefh3 + p_{44} \times coefh4$$

$$pi = ph1 \times coefv1 + ph2 \times coefv2 + ph3 \times coefv3 + ph4 \times coefv4$$

Interpolation Example 2, (1−d)/e>1:
Selecting pixel to be interpolated:

$$p_{11} = P(i-1,j), p_{12} = P(i-1,j+1), p_{13} = P(i-1,j+2), p_{14} = P(i-1,j+3)$$

$$p_{21} = P(i,j-1), p_{22} = P(i,j), p_{23} = P(i,j+1), p_{24} = P(i,j+2)$$

$$p_{31} = P(i+1,j-2), p_{32} = P(i+1,j-1), p_{33} = P(i+1,j), p_{34} = P(i+1,j+1)$$

$$p_{41} = P(i+2,j-3), p_{42} = P(i+2,j-2), p_{43} = P(i+2,j-1), p_{44} = P(i+2,j)$$

Interpolating Equations:

$$\Delta h = d+e, \Delta v = e$$

$$coefh1 = (-\Delta h^3 + 2 \times \Delta h^2 - \Delta h)/2, coefh2 = (3 \times \Delta h^3 - 5 \times \Delta h^2 + 2)/2$$

$$coefh3 = (-3 \times \Delta h^3 + 4 \times \Delta h^2 + \Delta h)/2, coefh4 = (\Delta h^3 - \Delta h^2)/2$$

$$coefv1 = (-\Delta v^3 + 2 \times \Delta v^2 - \Delta v)/2, coefv2 = (3 \times \Delta v^3 - 5 \times \Delta v^2 + 2)/2$$

$$coefv3 = (-3 \times \Delta v^3 + 4 \times \Delta v^2 + \Delta v)/2, coefv4 = (\Delta v^3 - \Delta v^2)/2$$

$$ph1 = p_{11} \times coefh1 + p_{12} \times coefh2 + p_{13} \times coefh3 + p_{14} \times coefh4$$

$$ph2 = p_{21} \times coefh1 + p_{22} \times coefh2 + p_{23} \times coefh3 + p_{24} \times coefh4$$

$$ph3 = p_{31} \times coefh1 + p_{32} \times coefh2 + p_{33} \times coefh3 + p_{34} \times coefh4$$

$$ph4 = p_{41} \times coefh1 + p_{42} \times coefh2 + p_{43} \times coefh3 + p_{44} \times coefh4$$

$$pi = ph1 \times coefv1 + ph2 \times coefv2 + ph3 \times coefv3 + ph4 \times coefv4$$

According to the present invent, the parallelogram bilinear interpolation method differs from bilinear interpolation method in that: when selecting an array of pixels to be interpolated, directionally offsetting the reference array based on the angles corresponding to the angle domain where the pixel to be interpolated is located and based on the location of the pixel to be interpolated, I.e., selection of the source image pixels involved in interpolation depends on the selection of a pixel array for bilinear interpolation as a basic expansion, directionally offsetting the reference array based on the interpolating direction, and adjusting the pixel adjusting according to the position where the pixel to be interpolated is located.

Figure 8:
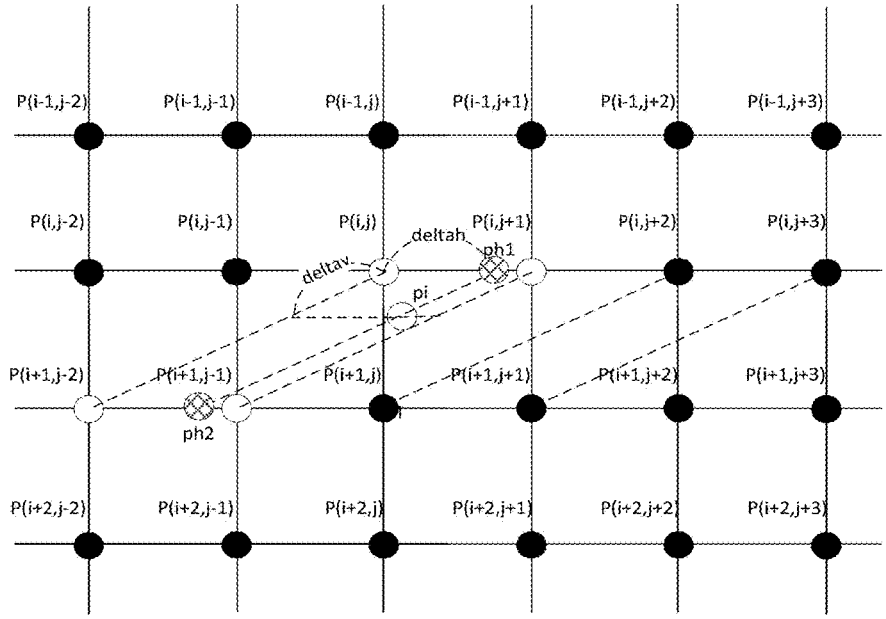
FIG. 8 is a schematic diagram illustrating a parallelogram bilinear interpolation is adopted at angle domain of 22.5 degrees according to the present invention.

FIG. 8 is a schematic view illustrating a parallelogram bilinear interpolation at angle domain of 22.5 degrees is adopted according to the present invention, where d, e satisfy (1−d)/e>2. There are three interpolation cases based on the relationship of relative position between the pixel to be interpolated and the source image.

Interpolation case 1, as shown in FIG. 8, (1−d)/e>2
Selecting a pixel to be interpolated:

$$p1 = P(i,j), p2 = P(i,j+1)$$

$$p3 = P(i+1,j-2), p4 = P(i+1,j-1)$$

Interpolation Equation:

$$\Delta h = 2e+d, \Delta v = e$$

$$ph1 = (1-\Delta h) \times p1 + \Delta h \times p2$$

$$ph2 = (1-\Delta h) \times p3 + \Delta h \times p4$$

$$pi = (1-\Delta v) \times ph1 + \Delta v \times ph2$$

In the equations, ph1 and ph2 are two pixels to be interpolated obtained by interpolating in the "horizontal direction".

Interpolating case 2, (1−d)/e≤2 and d/(1−e)<2:
Selecting a pixel to be interpolated:

$$p1 = P(i,j+1), p2 = P(i,j+2)$$

$$p3 = P(i+1,j-1), p4 = P(i+1,j)$$

Interpolation Equation:

$$\Delta h = 2e+d-1, \Delta v = e$$

$$ph1 = (1-\Delta h) \times p1 + \Delta h \times p2$$

$$ph2 = (1-\Delta h) \times p3 + \Delta h \times p4$$

$$pi = (1-\Delta v) \times ph1 + \Delta v \times ph2$$

Interpolating case 3, d/(1−e)≥2:
Selecting a pixel to be interpolated:

$$p1 = P(i,j+2), p2 = P(i,j+3)$$

$$p3 = P(i+1,j), p4 = P(i+1,j+1)$$

Interpolation Equation:

$$\Delta h = 2e+d-2, \Delta v = e$$

$$ph1 = (1-\Delta h) \times p1 + \Delta h \times p2$$

$$ph2 = (1-\Delta h) \times p3 + \Delta h \times p4$$

$$pi = (1-\Delta v) \times ph1 + \Delta v \times ph2$$

The interpolation process at angle domain of 67.5, 112.5 and 157.5 degrees is similar to angle domain of 22.5 degrees, the interpolating process at angle domain of 135 degrees is similar to angle domain of 45 degrees.

Figure 9:
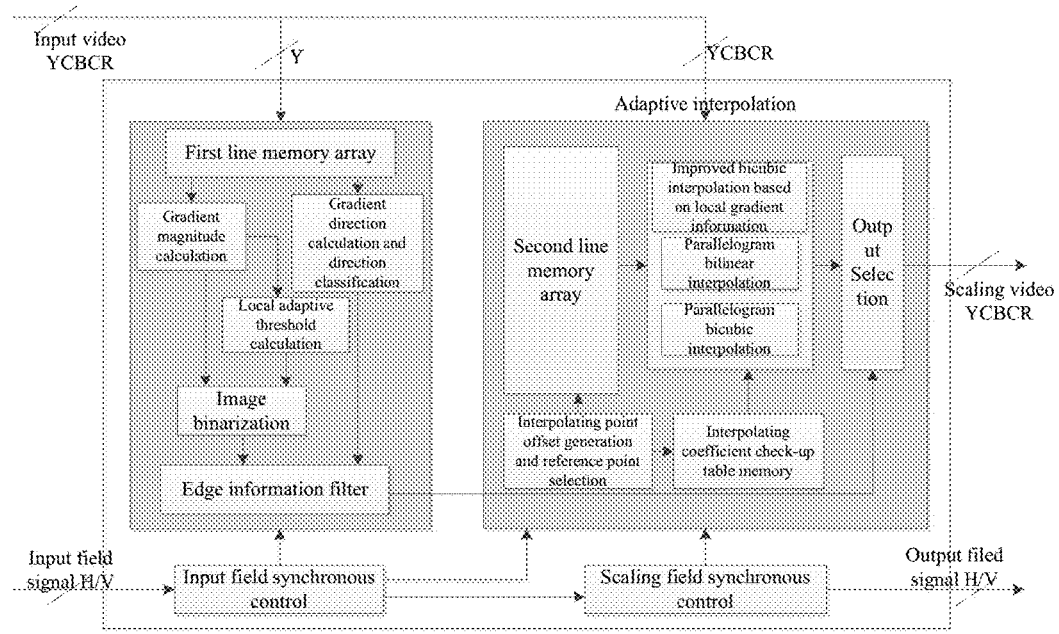
FIG. 9 is a VLSI implementation device for implementing the edge-directed adaptive image interpolation according to the present invention.

FIG. 9 shows a VLSI implementation device for implementing the edge-directed adaptive image interpolation according to the present invention. This figure explains the implementation method of the device depicted in FIG. 1, but it does not represent a limitation on implementing of hardware of the present invention.

Referring to FIG. 9, the VLSI implementation device for implementing edge-directed adaptive image interpolation includes four modules: an edge information extracting module, an adaptive interpolating module, an input field synchronous control module and a scaling field synchronous control module.

Input video signals of the VLSI implementation device for implementing the edge-directed adaptive image interpolation are video YCBCR signal and input field signal H/V, while outputs are scaling video YCBCR signal which match display resolution and scaling field signal.

The input field synchronous control module is configured to provide a synchronized field signal H/V to the edge information extracting module, the adaptive interpolating module and the scaling field synchronous control module. The edge information extracting module is configured to extract edge information from input video YCBCR signals. The scaling field synchronous control module is configured to generate scaling video H/V synchronous information, output the scaling field synchronized signal H/V to the adaptive interpolation module, and output the scaling field synchronous signal H/V for further use of modules in video system. The adaptive interpolating module is configured to adaptively interpolate an input video YCBCR signal, and then output a scaling video YCBCR signal which matches the resolution of display.

The edge information extracting module includes a first line memory array module, a local adaptive threshold value computation module, a gradient magnitude computation module, a gradient direction computation and classification module, an image binarization module and an edge information filtering module, in which only luminance information in the video signal is required.

The hardware implementation manner of the first line memory array module is dual-port SRAM, configured to buffer video data in adjacent lines, and provide a corresponding data basis for processing of the following modules; The gradient magnitude computation module is configured to compute the gradient magnitude of the source image; The local adaptive threshold value computation module is configured to obtain the local adaptive threshold value which corresponds to each pixel of the source image, after passing a 3*3 average filter, on the basis of gradient magnitude computation;

The image binarization module is configured to input the gradient magnitude and the local adaptive threshold value of the source image, and extract edge information of the source image by comparing the gradient magnitude and corresponding local adaptive threshold value of the source image; the gradient direction computation and classification module is configured to divide the edge direction into eight angle domains according to the edge direction; and the edge information filtering module is configured to determine whether the pixel to be interpolated is located at the regular edge region, and adjust the edge direction of the pixel to be interpolated.

The adaptive interpolation module includes a second line memory array module, a pixel to be interpolated offset generation and reference pixel selection module, an interpolation coefficient look-up table memory module, three-patterns interpolating modules and an output selection module.

The pixel to be interpolated offset generation and reference pixel selection module is configured to compute offset between the pixel to be interpolated and the reference pixel, and compute the reference pixels array required for the present interpolation, then send the computed offset signal to the interpolation coefficient look-up table memory module.

The hardware implementation manner of the interpolating coefficient look-up table memory module is ROM or SRAM, configured to obtain the interpolating coefficients required for the present pixel to be interpolated based on the offset.

The hardware implementation manner of the second line memory array module is dual-port SRAM, configured to buffer video data in adjacent lines, and select corresponding reference pixels array based on the present pixel to be interpolated, provide essential reference data for following interpolation process.

The three-patterns interpolating modules include an improved bicubic interpolating module based on gradient information, a parallelogram bilinear interpolation module and a parallelogram bicubic interpolation module; the input signals of three-patterns interpolation modules are interpolating coefficients obtained from the output of interpolating coefficient look-up table memory module and the interpolating reference pixel array obtained from the output of the second line memory array module. The output selection module is configured to select an interpolating method that interpolates the present pixel to be interpolated, from the three-patterns interpolating modules. The selection of interpolating method is decided by adopting the output of using the edge information outputted by the edge information extracting module as a control signal.

What is claimed is:

1. A method of edge-directed adaptive image interpolation, the method comprising the steps of:
    1) computing a gradient magnitude and a gradient direction of a source image pixel, and obtaining edge information by comparing the gradient magnitude with a local adaptive threshold value, wherein an edge direction is a vertical direction of the gradient direction;
    2) dividing the edge direction into eight angle domains, and filtering edge information by an edge information filtering method, so that the source image is divided into a regular edge region and a non-edge region; wherein the filtering method comprises the steps of:
    2.1) selecting 16 pixels in a 4*4 array around a pixel pi to be interpolated as reference pixels for filtering edge information, the 4*4 array being regarded as a reference array, counting the number of edge pixels in the 4*4 array, denoted as counter; counting, among the edge pixels in the 4*4 array, the number of the edge pixels in each of the eight angle domains classified according to edge direction, respectively, denoted as edge_counter (m), m=0, 1, . . . 7; finding out the angle domain with the maximum number of the edge pixels from the eight angle domains, denoted as $m_{max}$, the number of edge pixels thereof being denoted as max_edge_counter, and direction of the edge pixels being denoted as max_edge_region;
    2.2) if counter ≥4 and max_edge_counter/counter>th, then pi is located at the regular edge region; the edge direction of pi is denoted as max_edge_region, conducting interpolation along the edge direction of pi; otherwise, pi is located at the non-edge region; wherein, th represents a judging threshold value;
    3) dividing the eight angle domains obtained through edge direction classification into angle class I, angle class II and angle class III; when the pixel to be interpolated pi is located at the regular edge region, and if pi is in the angle class I, interpolating the image using an improved bicubic interpolation method based on local gradient information; if pi is in the angle class II, interpolating the image using a parallelogram bicubic interpolation method; if pi is in the angle class III, interpolating the image using a parallelogram bilinear interpolation method;
    when pi is located at the non-edge region, interpolating the image using the improved bicubic interpolation method based on local gradient information.

2. The method of edge-directed adaptive image interpolation according to claim 1, wherein the local adaptive threshold value is computed as:
    for each pixel of the source image, calculating an average value average_th of the gradient magnitude within a 3*3 window, which takes the pixel as the center, a local adaptive threshold value local_th is obtained through the following equation:

local_th=max(average_th,min_th)

wherein min_th is a determined lower limit of the local adaptive threshold value.

3. The method of edge-directed adaptive image interpolation according to claim 1, wherein the method in step 2) of dividing the edge direction into eight angle domains is:
dividing the edge direction into eight angle domains, denoted as angle domains 0-7, taking a ray line, respectively, in the direction of 0, 22.5, 45, 67.5, 90, 112.5, 135 and 157.5 degrees which passes a zero crossing point and its respective oppositely extension line as a central dividing line, and then rotating the central dividing line clockwise and counterclockwise 11.25 degrees respectively.

4. The method of edge-directed adaptive image interpolation according to claim 3, wherein in step 3) the angle Class I comprises angle domain 0 and angle domain 4, the angle domain 0 is in the horizontal edge direction, and the angle domains 4 is in the vertical edge direction; the angle Class II comprises angle domain 2 and angle domain 6, the angle domain 2 is in the edge direction of 45 degrees, and the edge domain 6 is in the edge direction of 135 degrees; the angle class III comprises angle domain 1, angle domain 3, angle domain 5 and angle domain 7, the angle domain 1 is in the edge direction of 22.5 degrees, the angle domain 3 is in the direction of 67.5 degrees, the edge domain 5 is in the edge direction of 112.5 degrees and the angle domain 7 is in the edge direction of 157.5 degrees.

5. The method of edge-directed adaptive image interpolation according to claim 4, wherein the improved bicubic interpolation method based on local gradient information is:
pi is defined as the pixel to be interpolated, P(i−1, j−1)∼P(i+2, j+2) represents 16 pixels of the source image in the domain adjacent to pi, an adjusted template of interpolating coefficient weight is as follows:

$$\begin{cases} H_l = 1 / \sqrt{\dfrac{1 + \alpha(\mathrm{abs}(P(i, j) - P(i, j-1))) +}{\alpha(\mathrm{abs}(P(i+1, j) - P(i+1, j-1)))}} \\ H_r = 1 / \sqrt{\dfrac{1 + \alpha(\mathrm{abs}(P(i, j+1) - P(i, j+2))) +}{\alpha(\mathrm{abs}(P(i+1, j+1) - P(i+1, j+2)))}} \\ V_u = 1 / \sqrt{\dfrac{1 + \alpha(\mathrm{abs}(P(i, j) - P(i-1, j))) +}{\alpha(\mathrm{abs}(P(i, j+1) - P(i-1, j+1)))}} \\ V_l = 1 / \sqrt{\dfrac{1 + \alpha(\mathrm{abs}(P(i+1, j) - P(i+2, j))) +}{\alpha(\mathrm{abs}(P(i+1, j+1) - P(i+2, j+2)))}} \end{cases}$$

in the equations: $H_l$ is an adjusted template of weight at the left of the horizontal direction; $H_r$ is an adjusted template of weight at the right of the horizontal direction; $V_u$ is an adjusted template of weight at upper side of the vertical direction; $V_l$ is an adjusted template of weight at lower side of the vertical direction; a is an adjustable parameter;
after computing the templates of $H_l$, $H_r$, $V_u$ and $V_l$, conducting a process of normalization to interpolating coefficients, thereby to obtain an improved bicubic interpolation equation based on local gradient information, followed by interpolating the pixel to be interpolated using the improved bicubic interpolation equation based on local gradient information.

6. The method of edge-directed adaptive image interpolation according to claim 4, wherein in step 3) the parallelogram bicubic interpolation method differs from the bicubic interpolation method in that: when selecting an array for the pixel to be interpolated, directionally offsetting the reference array based on corresponding angle of angle domain where the pixel to be interpolated is located and the location of the pixel to be interpolated.

7. The method of edge-directed adaptive image interpolation according to claim 4, wherein in step 3) the parallelogram bilinear interpolation method differs from bilinear interpolation method in that: when selecting an array for the pixel to be interpolated, directionally offsetting the reference array based on corresponding angle of angle domain where the pixel to be interpolated is located and the location of the pixel to be interpolated.

8. A VLSI implementation device for implementing the method of edge-directed adaptive image interpolation according to claim 1, the device comprises an edge information extracting module, an adaptive interpolating module, an input field synchronous control module and an scaling field synchronous control module; wherein:
the input field synchronous control module is configured to provide a synchronized field signal H/V to the edge information extracting module, the adaptive interpolation module and the scaling field synchronous control module;
the edge information extracting module is configured to extract edge information from input video image;
the scaling field synchronous control module is configured to generate scaling video H/V synchronous information, output the scaling field synchronous signal H/V to the adaptive interpolating module; and
the adaptive interpolating module is configured to adaptively interpolate an input video, and then output a scaling video signal which matches the resolution of display.

9. The VLSI implementation device for implementing the method of edge-directed adaptive image interpolation according to claim 8, wherein the edge information extracting module comprises a first line memory array module, a gradient magnitude computation module, a gradient direction computation and classification module, a local adaptive threshold value computation module, an image binarization module and an edge information filtering module; wherein:
a hardware implementation manner of the first line memory array module, is dual-port SRAM, configured to buffer video data in adjacent lines;
the gradient magnitude computation module is configured to compute the gradient magnitude of a source image;
the local adaptive threshold value computation module is configured to obtain the local adaptive threshold value which corresponds to each pixel of the source image, after passing a 3*3 average filter, on the basis of gradient magnitude computation;
the image binarization module is configured to input the gradient magnitude and the local adaptive threshold value of the source image, and extract edge information of the source image by comparing the gradient magnitude and corresponding local adaptive threshold value of the source image;
the gradient direction computation and classification module is configured to divide the edge direction into eight angle domains according to the edge direction; and
the edge information filtering module is configured to determine whether the pixel to be interpolated is located at the regular edge region, and adjust the edge direction of the pixel to be interpolated.

10. The VLSI implementation device for implementing the method of edge-directed adaptive image interpolation according to claim 9, wherein the adaptive interpolating module comprises a second line memory array module, a pixel to be interpolated offset generation and reference pixel selection module, an interpolation coefficient look-up table memory module, three-patterns interpolating modules and an output selection module; wherein:

the pixel to be interpolated offset generation and reference pixel selection module is configured to compute offset between the pixel to be interpolated and the reference pixel, and compute the reference pixels array required for the present interpolation, then send the computed offset signal to the interpolation coefficient look-up table memory module;

a hardware implementation manner of the interpolating coefficient look-up table memory module is ROM or SRAM, configured to obtain the interpolating coefficients required for the present pixel to be interpolated based on the offset;

a hardware implementation manner of the second line memory array module is dual-port SRAM, configured to buffer video data in adjacent lines, and select corresponding reference pixels array based on the present pixel to be interpolated;

the three-patterns interpolating modules comprise an improved bicubic interpolating module based on gradient information, a parallelogram bilinear interpolation module and a parallelogram bicubic interpolation module; the input signals of the three-patterns interpolation modules are interpolating coefficients obtained from the output of the interpolating coefficient look-up table memory module and interpolating reference pixel array obtained from the output of the second line memory array module; and the output selection module is configured to select an interpolating method that interpolates the present pixel to be interpolated from the three-patterns interpolating modules; the selection of interpolating method is decided by adopting the output of using the edge information outputted by the edge information extracting module as a control signal.

\* \* \* \* \*